(12) United States Patent
Siebeck et al.

(10) Patent No.: US 9,499,123 B2
(45) Date of Patent: Nov. 22, 2016

(54) ASSEMBLY FOR A BELT RETRACTOR

(75) Inventors: Boris Siebeck, Schwabisch Gmund (DE); Demal Sehic, Schwabisch Gmund (DE); Julius Adomeit, Berlin (DE)

(73) Assignee: TRW Automotive GmbH (DE)

( * ) Notice: Subject to any disclaimer, the term of this patent is extended or adjusted under 35 U.S.C. 154(b) by 204 days.

(21) Appl. No.: 14/118,908

(22) PCT Filed: May 22, 2012

(86) PCT No.: PCT/EP2012/002161
§ 371 (c)(1),
(2), (4) Date: Feb. 6, 2014

(87) PCT Pub. No.: WO2012/159731
PCT Pub. Date: Nov. 29, 2012

(65) Prior Publication Data
US 2015/0115090 A1    Apr. 30, 2015

(30) Foreign Application Priority Data
May 25, 2011    (DE) .......................... 10 2011 103 113

(51) Int. Cl.
*B60R 22/36*    (2006.01)
*B60R 22/40*    (2006.01)

(52) U.S. Cl.
CPC ............... *B60R 22/36* (2013.01); *B60R 22/40* (2013.01); *B60R 2022/401* (2013.01)

(58) Field of Classification Search
CPC .................................. B60R 22/36; B60R 22/40
USPC ............................................ 242/384.4–384.6
See application file for complete search history.

(56) References Cited

U.S. PATENT DOCUMENTS

| | | | | |
|---|---|---|---|---|
| 4,978,087 A | * | 12/1990 | Tauber | 242/384.4 |
| 5,622,383 A | * | 4/1997 | Kielwein et al. | 280/806 |
| 6,299,093 B1 | * | 10/2001 | Harte et al. | 242/384.4 |
| 8,469,302 B2 | * | 6/2013 | Lee et al. | 242/384.4 |
| 2001/0028167 A1 | | 10/2001 | Kielwein et al. | |

FOREIGN PATENT DOCUMENTS

DE    200 06 314    9/2000

* cited by examiner

*Primary Examiner* — Sang Kim
(74) *Attorney, Agent, or Firm* — Tarolli, Sundheim, Covell & Tummino LLP (57) ABSTRACT

An assembly for a belt retractor includes a vehicle-sensitive sensor and a holding fixture (10) for the sensor. The sensor and the holding fixture (10) have geometric designs that interact and are adjusted to each other so that the sensor can be mounted at various spatial orientations in the holding fixture (10). In a belt retractor for a vehicle seat belt comprising such assembly the holding fixture (10) is coupled with the sensor at a fixed position to the frame of the belt retractor in which a belt reel of the belt retractor is rotatably supported.

10 Claims, 16 Drawing Sheets

ASSEMBLY FOR A BELT RETRACTOR

RELATED APPLICATIONS

This application corresponds to PCT/EP2012/002161, filed May 22, 2012, which claims the benefit of German Application No. 10 2011 103 113.1, filed May 25, 2011, the subject matter, of which are incorporated herein by reference in their entirety.

BACKGROUND OF THE INVENTION

The invention relates to an assembly for a belt retractor comprising a vehicle-sensitive sensor and a holding fixture for the sensor. The invention further relates to a belt retractor for a vehicle seat belt comprising such assembly.

Belt retractors having a vehicle-sensitive mechanism for blocking the belt reel comprise an acceleration sensor including an inertia body the deflection of which initiates the blocking operation. The sensors are fixedly arranged on or coupled to the frame of the belt retractor.

It is a drawback of such sensors that they have to adopt a particular orientation inside the vehicle so as to ensure safe and reliable function. Since the mounting position of the belt retractor in the vehicle varies, however, especially dependent on the type of vehicle, it is required in these cases to provide different variants of the belt retractor having correspondingly different spatial orientations of the sensor.

SUMMARY OF THE INVENTION

Against this background it is the object of the invention to provide a belt retractor adapted to be used in a more flexible manner.

The object is achieved by an assembly and a belt retractor comprising the features of the present invention. Advantageous and expedient configurations of the assembly according to the invention and of the belt retractor according to the invention are described herein.

The assembly according to the invention for a belt retractor comprises a vehicle-sensitive sensor and a holding fixture for the sensor. The sensor and the holding fixture have geometric designs which interact and are adjusted to each other so that the sensor can be mounted in the holding fixture at various spatial orientations.

The invention is based on the finding that the drawbacks stated in the beginning can be avoided by the possibility of adapting the orientation of the sensor relative to the frame of the belt retractor. The holding fixture still provides a stationary position for the sensor at the belt retractor. The particular spatial configurations of the sensor and the holding fixture according to the invention permit a largely freely selectable orientation of the sensor, however, before it is finally fixed in the holding fixture. Thus the sensor can be adapted to the later mounting position of the belt retractor. The requirement of providing different variants of the belt retractor is dropped without additional components being necessary for this purpose.

Another advantage of the assembly according to the invention consists in the fact that the sensor can be adjusted (in accordance with a possibility of adjusting the sensor function values) by changing the orientation of the sensor in the holding fixture. Thus also the tool costs are reduced.

Blocking mechanisms which are released by a sensor including an inertia body adapted to be moved out of an idle position due to forces acting from outside have proved themselves. Being adjusted to such inertia body the freedom of orientation of the sensor can be achieved in that the geometric design of the holding fixture includes an inner receiving surface which is symmetrical with respect to the center or point of gravity or a tilt or pivot axis of the inertia body in the idle position thereof.

Accordingly, the sensor, especially a sensor housing receiving the inertia body, should include an outer surface that is symmetrical with respect to the center or point of gravity or a tilt or pivot axis of the inertia body in the idle position thereof.

In accordance with the preferred embodiment of the invention, each of the inner receiving surface of the holding fixture and the outer surface of the sensor includes a rounding, preferably the rounding of an imaginary ball whose center coincides with the center or point of gravity of the inertia body. This permits continuous rotation of the sensor in the holding fixture in any spatial directions, with the position of the center of the inertia body relative to the holding fixture and thus to the belt retractor always remaining constant.

For some time belt retractors based on the so called "floating spool" concept have been known. In this type of belt retractor the belt reel itself is movable between a release position and a blocking position. For this purpose, the belt reel is supported in a pivot lever and is controlled to be engaged in a blocking tooth system by the tensile force of the webbing in the case of vehicle-sensitive control of the sensor. In conformity with the invention, an intermediate lever pivoting by a movement of the inertia body can be pivoted at the holding fixture. This intermediate lever then is the part of the vehicle-sensitive blocking mechanism which initiates, by engaging in a control tooth system of the belt reel, the shifting thereof for blocking at the frame of the belt retractor.

In accordance with a particularly preferred structure of the assembly according to the invention, between the inertia body and the intermediate lever a sensor lever is arranged which is mounted on a sensor housing receiving the inertia body and is pivoted relative to the sensor housing. The sensor lever confers the movement of the inertia body out of the idle position thereof in the form of a defined pivoting motion upon the intermediate lever.

Especially for a sensor rotatable about the center or point of gravity of the inertia body, a sensor lever having a cap portion which covers the inertia body and has an outer surface including a rounding, preferably a rounding of an imaginary ball, whose center coincides with the center or point of gravity of the inertia body is advantageous. When rotating the sensor in the holding fixture, the spatial position of the contact point between the sensor lever and the intermediate lever thus remains unaffected, at least as long as the two levers are still opposing.

So that later the sensor does not inadvertently change its orientation in the holding fixture once set depending on the requirement during the lifetime of the belt retractor, the sensor and/or the holding fixture include means by which the sensor can be permanently fixed independently of the spatial orientation in the holding fixture.

The invention also provides a belt retractor for a vehicle seat belt comprising an assembly according to the invention. The holding fixture is coupled with the sensor fixed in position to a frame of the belt retractor in which a belt reel of the belt retractor is rotatably supported. Depending on the mounting position of the belt retractor in the vehicle, the relative mounting position of the sensor then can be adapted.

BRIEF DESCRIPTION OF THE DRAWINGS

Further features and advantages of the invention are resulting from the following description and from the enclosed drawings which are referred to. The drawings show in.

DESCRIPTION OF EMBODIMENTS

Figure 1:
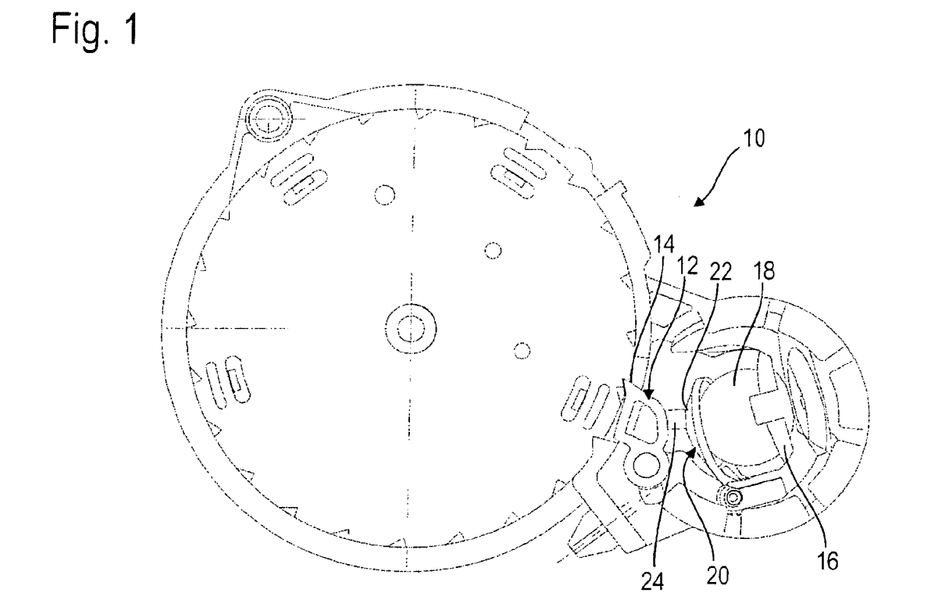
FIG. 1 a side view of an assembly according to the invention.
Figure 2:
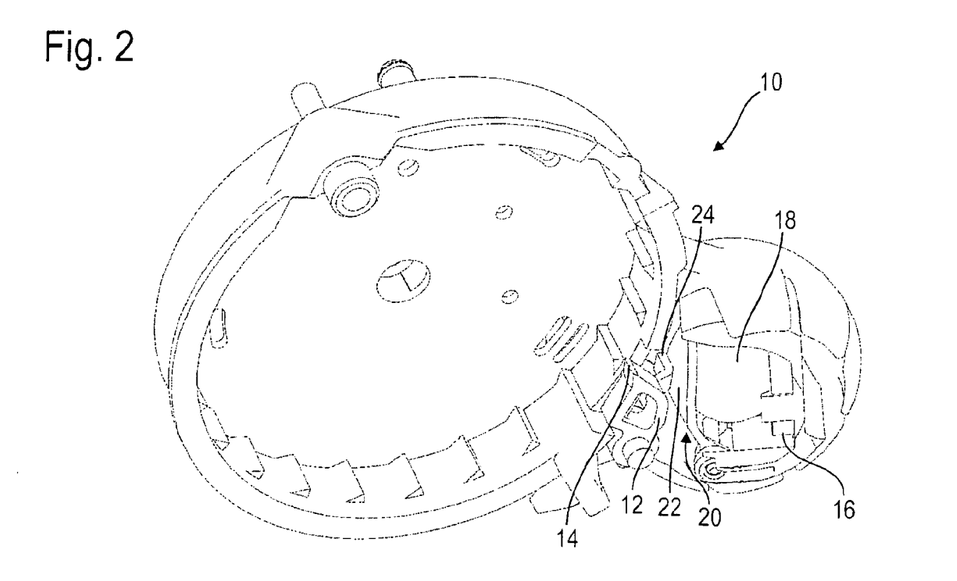
FIG. 2 a perspective view of the assembly from FIG. 1.

In FIGS. 1 and 2 a holding fixture for a vehicle-sensitive sensor is shown. The holding fixture 10 and the sensor are part of a belt retractor 1 (see FIGS. 17-24) for a vehicle seat belt comprising a belt reel 2 and a frame 3 in which the belt reel 2 can be shifted from a release position (FIGS. 17-20) in which it can freely rotate in the frame 3 to a blocking position (FIGS. 21-24) in which a blocking tooth system 4 of the belt reel 2 engages in blocking teeth 5 at the frame 3. This blocking concept is known to those skilled in the art as "floating spool" concept. The holding fixture in this case is a pivot lever of the belt retractor in which the belt reel is supported. The pivot lever moreover can be provided with an internal tooth system for the webbing-sensitive locking.

For a vehicle-sensitive blocking of the belt reel it is essential in this type of belt retractor that an intermediate lever 12 movably supported on the holding fixture can be pivoted from the release position shown in FIGS. 1 and 2, in which it does not engage in a control tooth system of the belt reel, so that it, more exactly speaking its tip 14, engages in the control tooth system. For pivoting the intermediate lever 12 a sensor responsive in a vehicle-sensitive manner including sensor housing 16, an inertia body 18, in this case a ball, and a sensor lever 20 operable by the inertia body 18 is provided.

Figure 3:
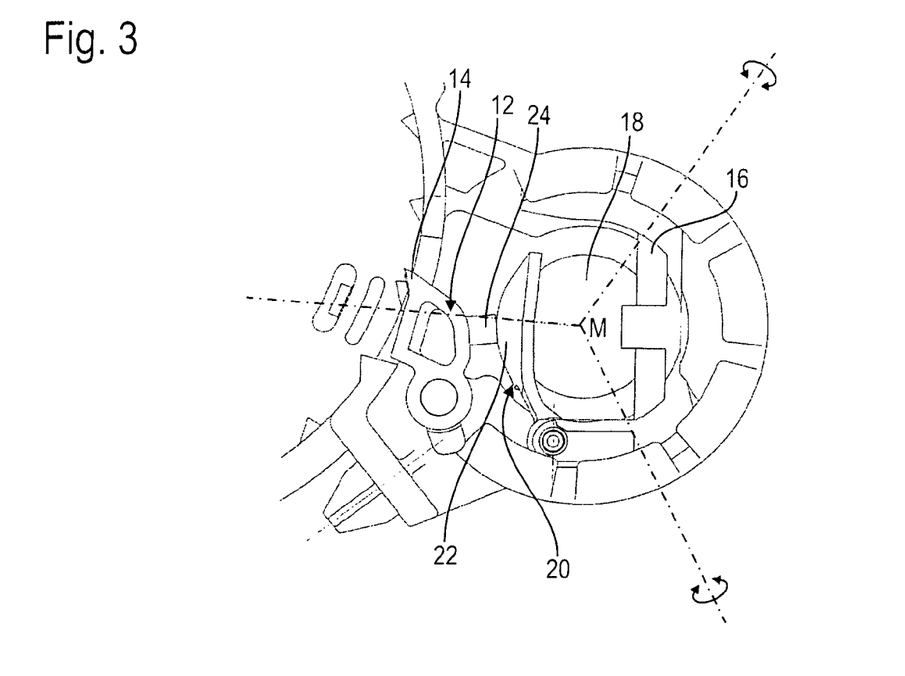
FIG. 3 an enlarged detail from FIG. 1.
Figure 4:
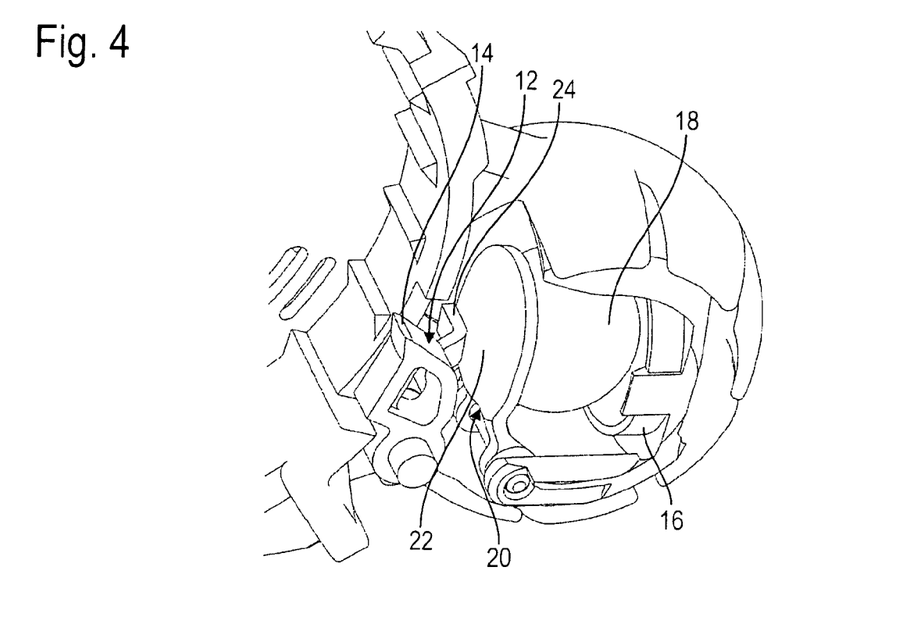
FIG. 4 a perspective view of the detail from FIG. 3.
Figure 5:
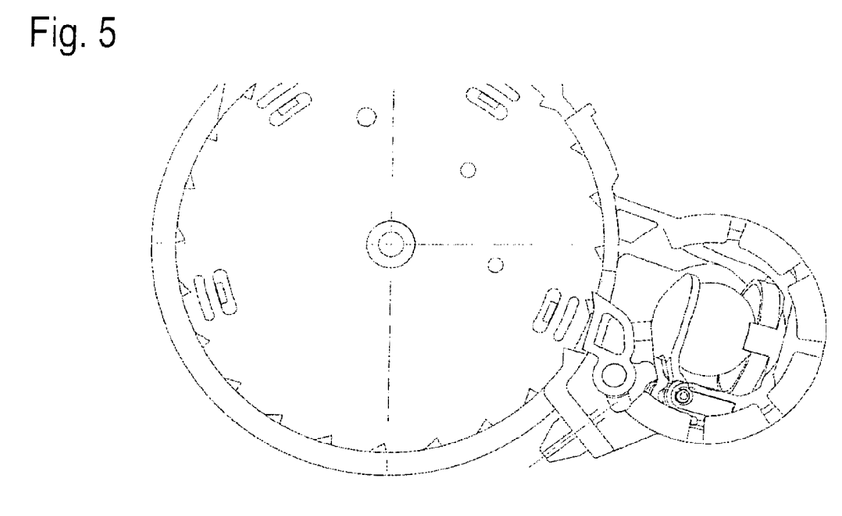
FIGS. 5 to 16 side views end perspective views of the assembly with different mounting positions of the sensor.
Figure 6:
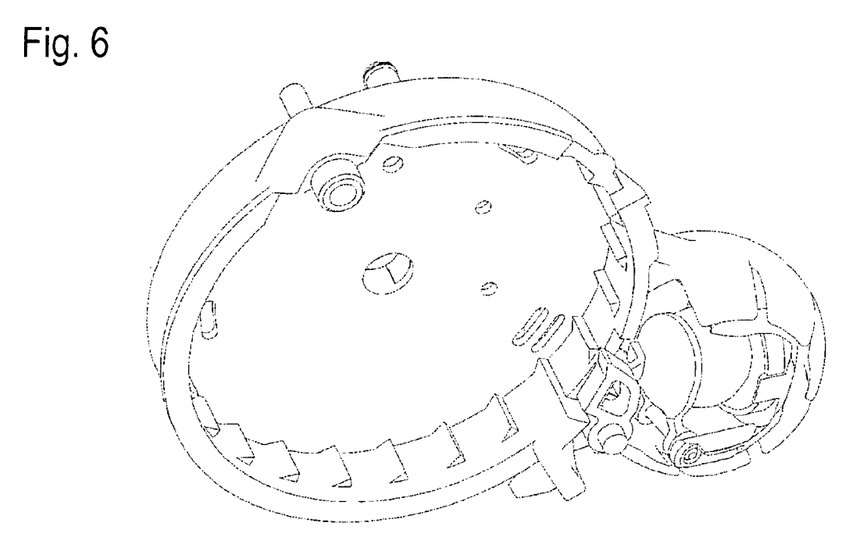
Figure 7:
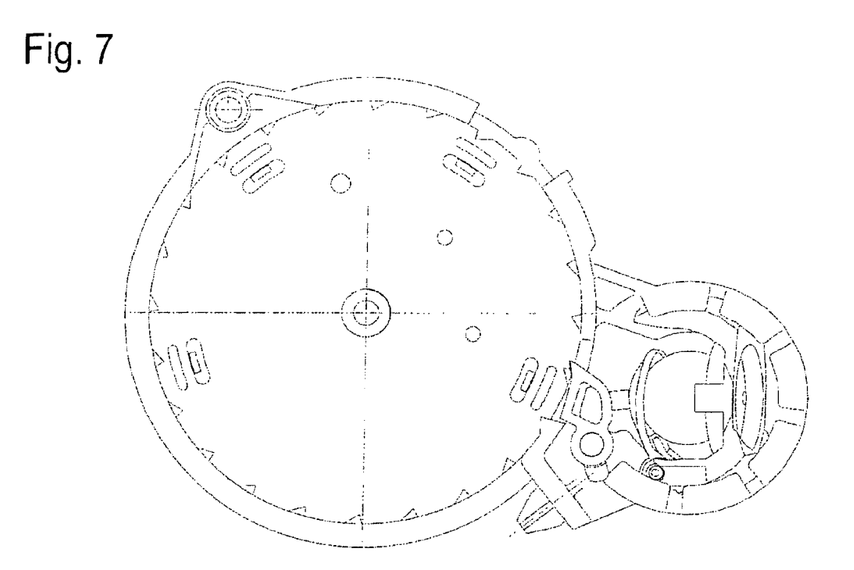
Figure 8:
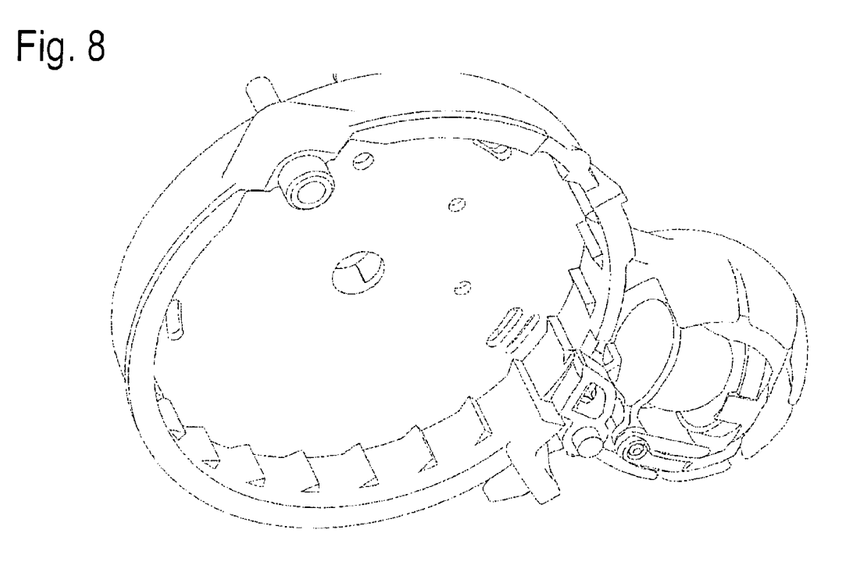
Figure 9:
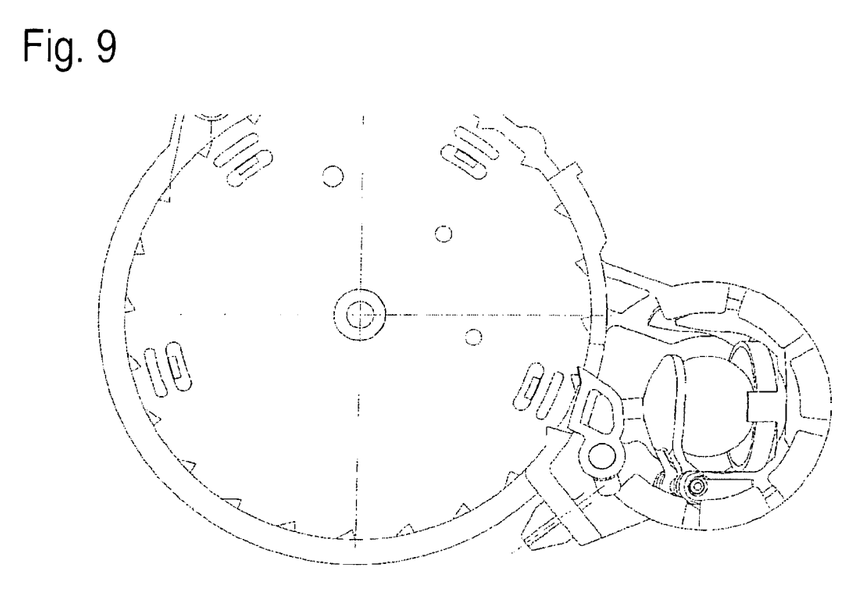
Figure 10:
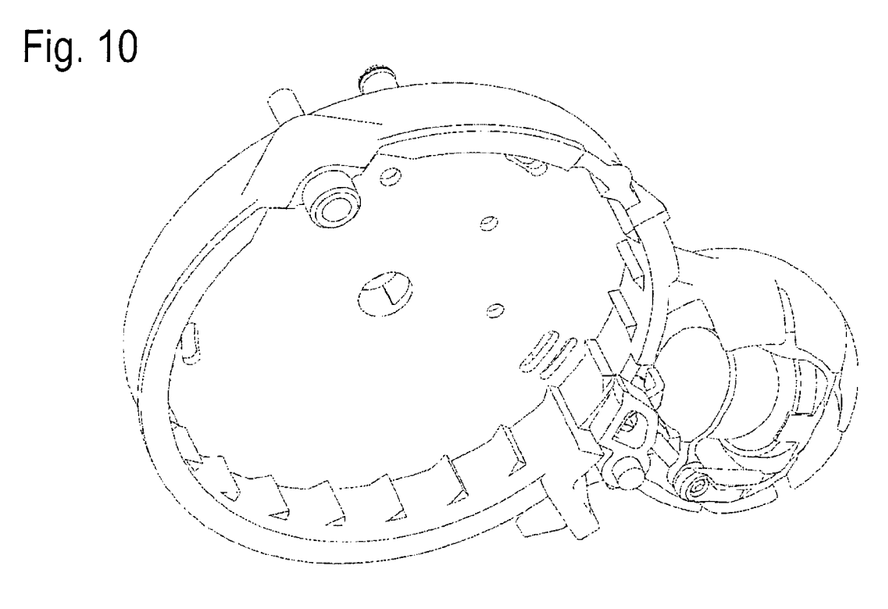
Figure 11:
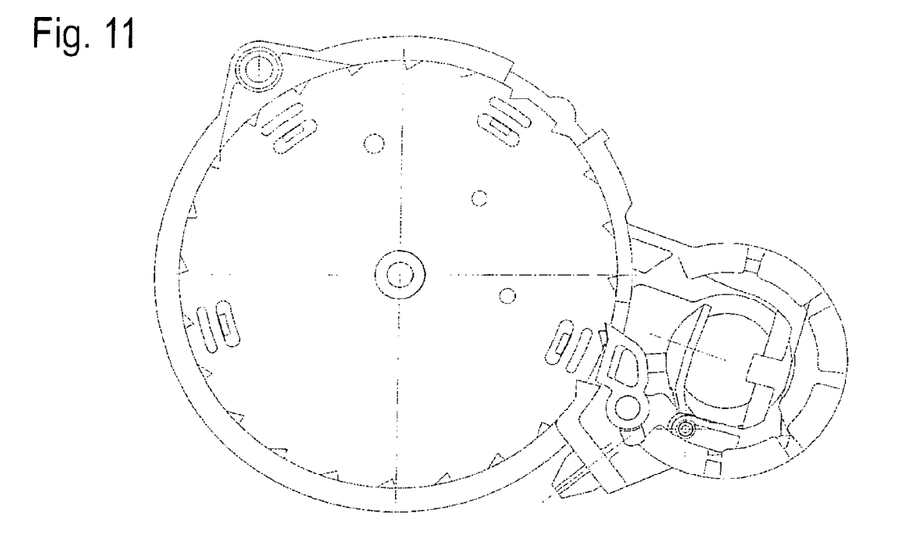
Figure 12:
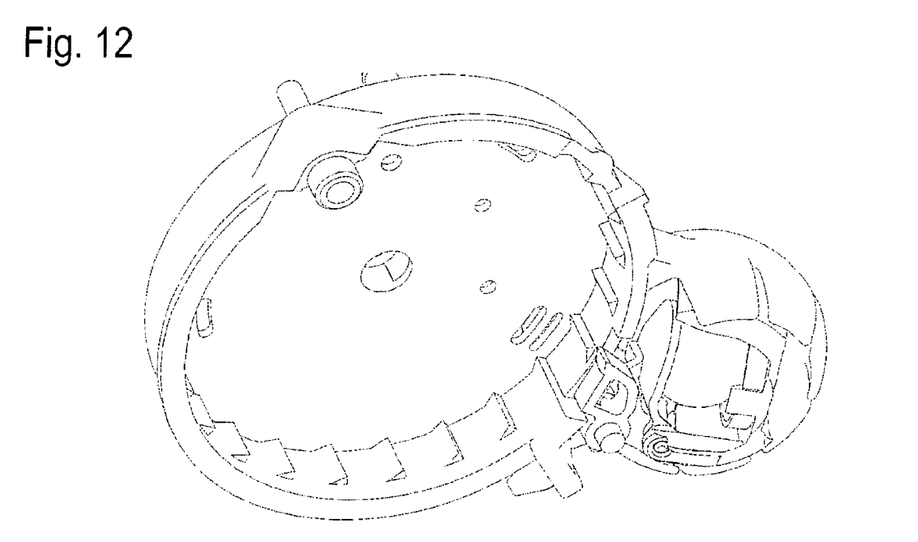
Figure 13:
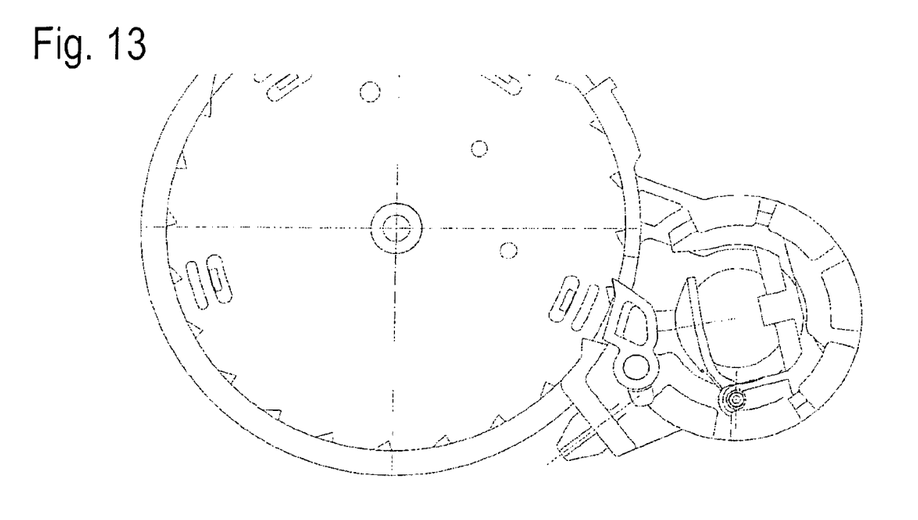
Figure 14:
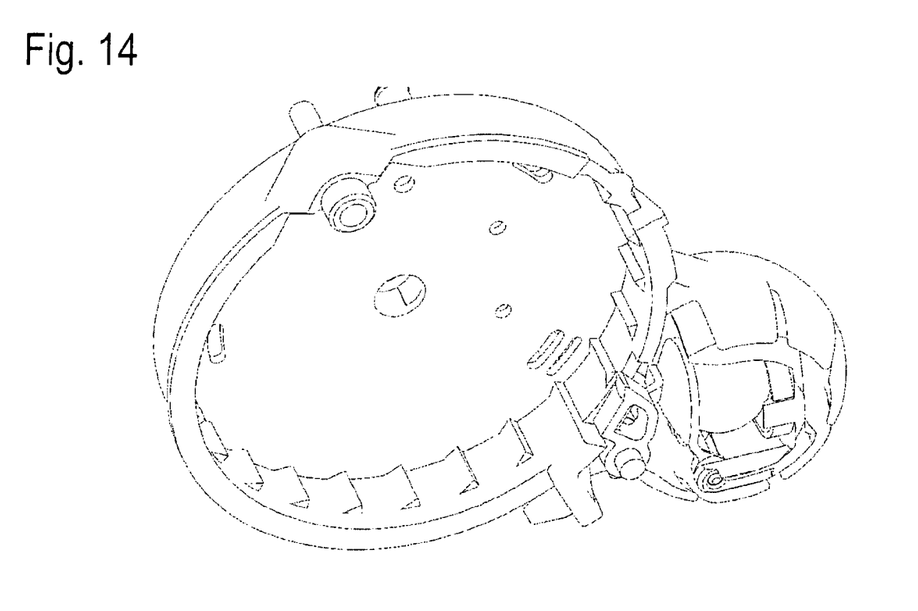
Figure 15:
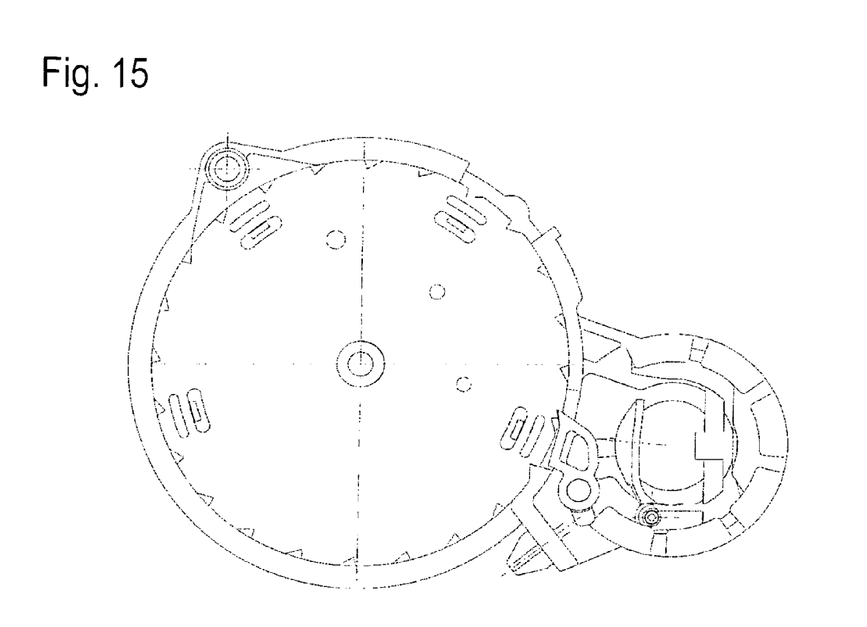
Figure 16:
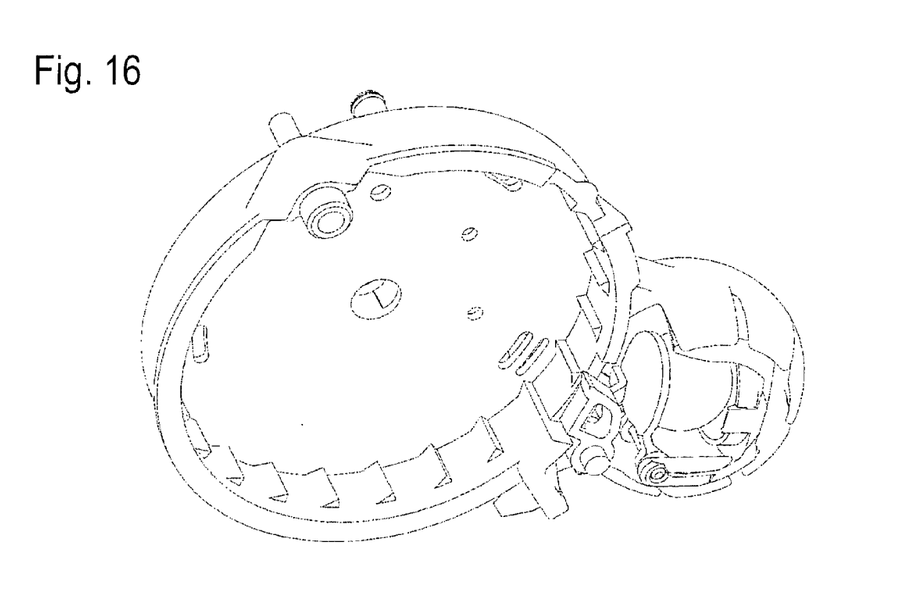
Figure 17:
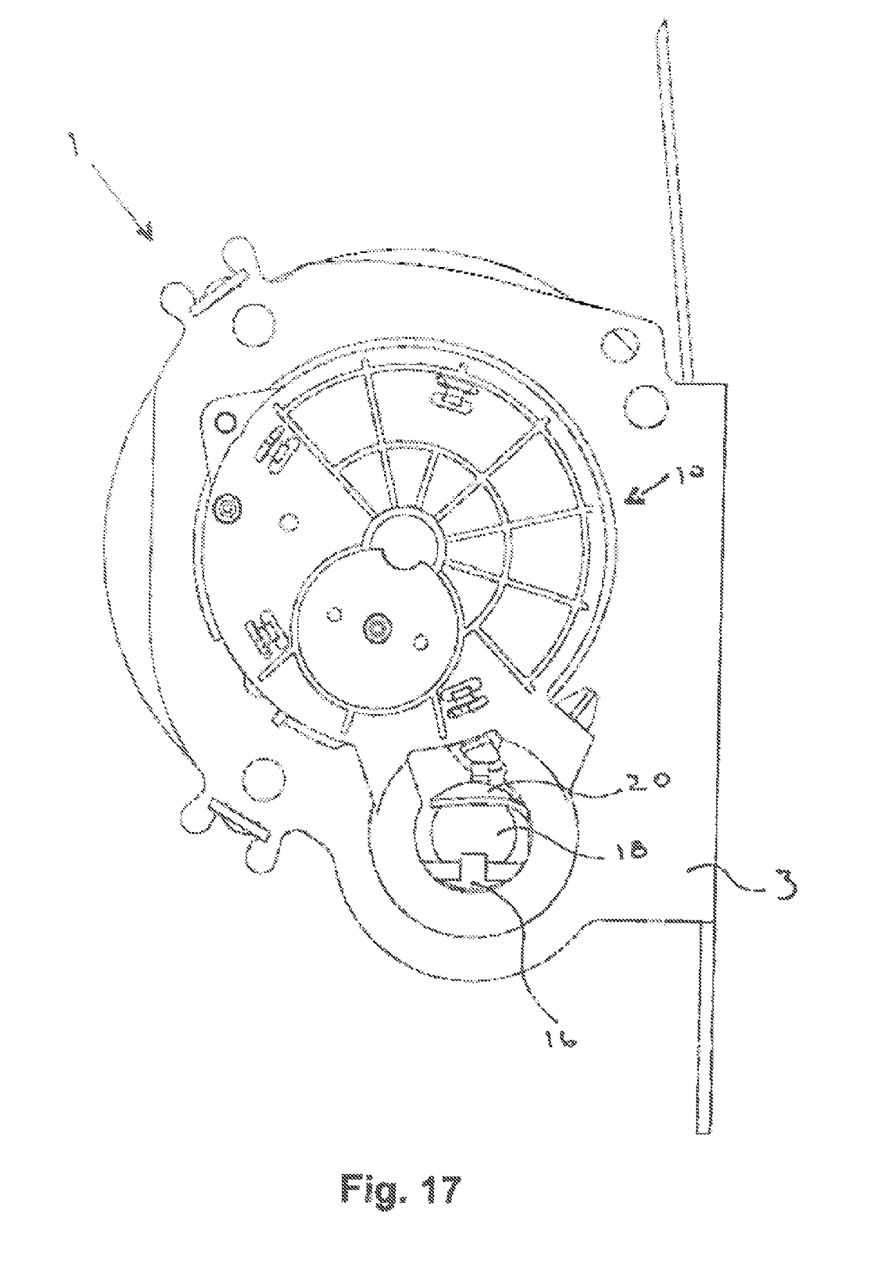
FIG. 17 is a side view of a belt retractor according to the invention in a release position.
Figure 18:
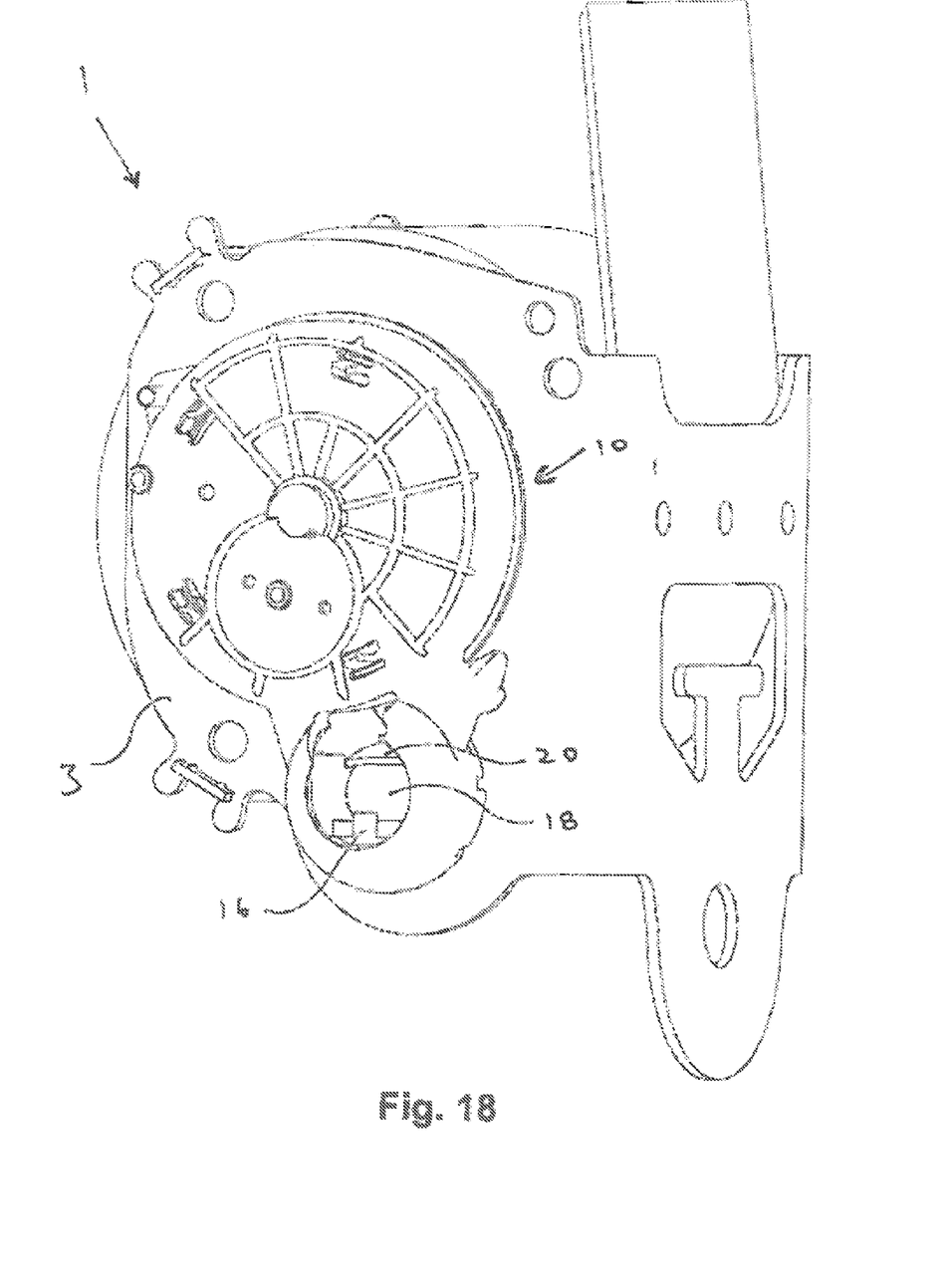
FIG. 18 is a perspective view of the belt retractor from FIG. 17.
Figure 19:
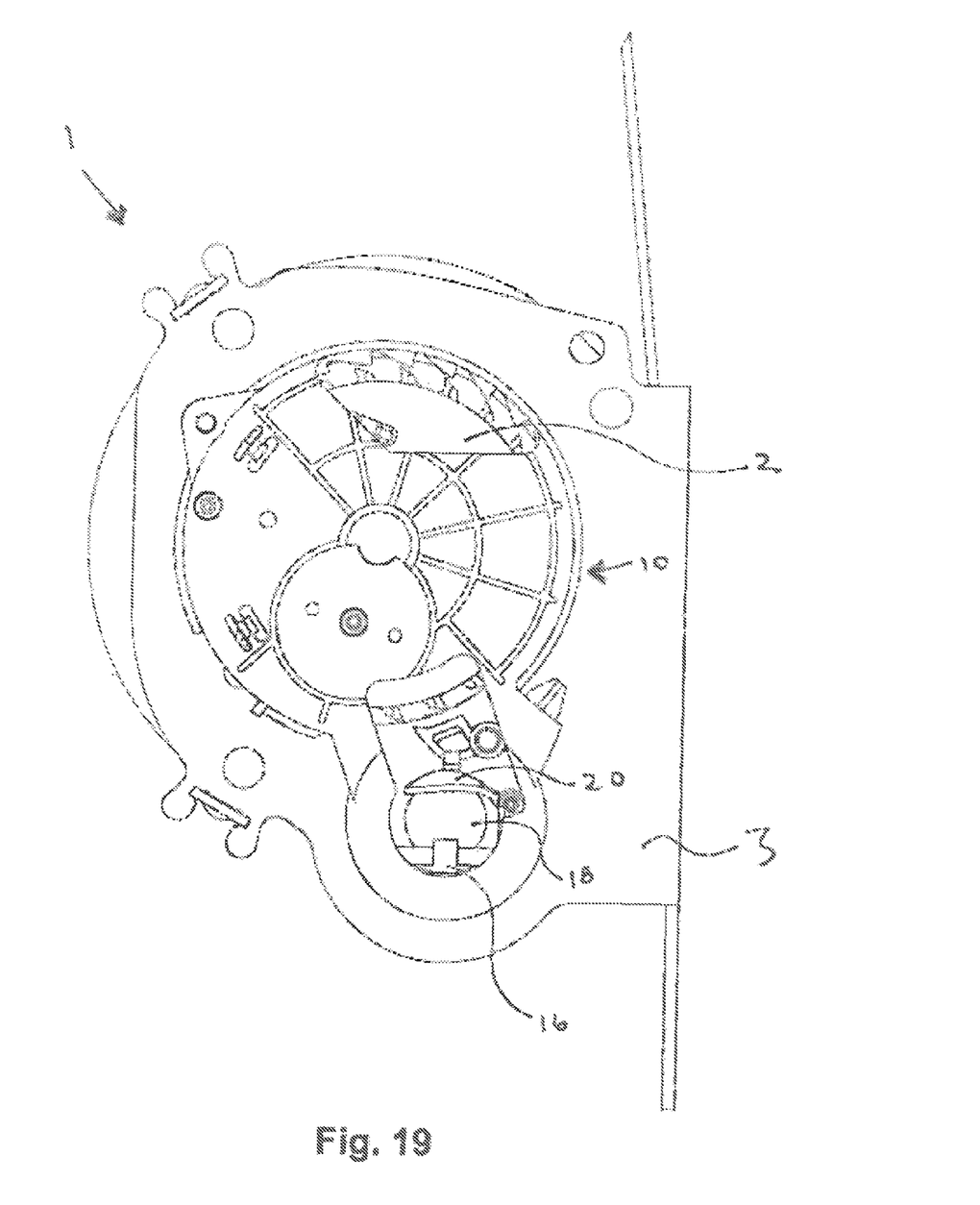
FIG. 19 is a side view of the belt retractor from FIG. 17 with portions of the belt retractor omitted for clarity.
Figure 20:
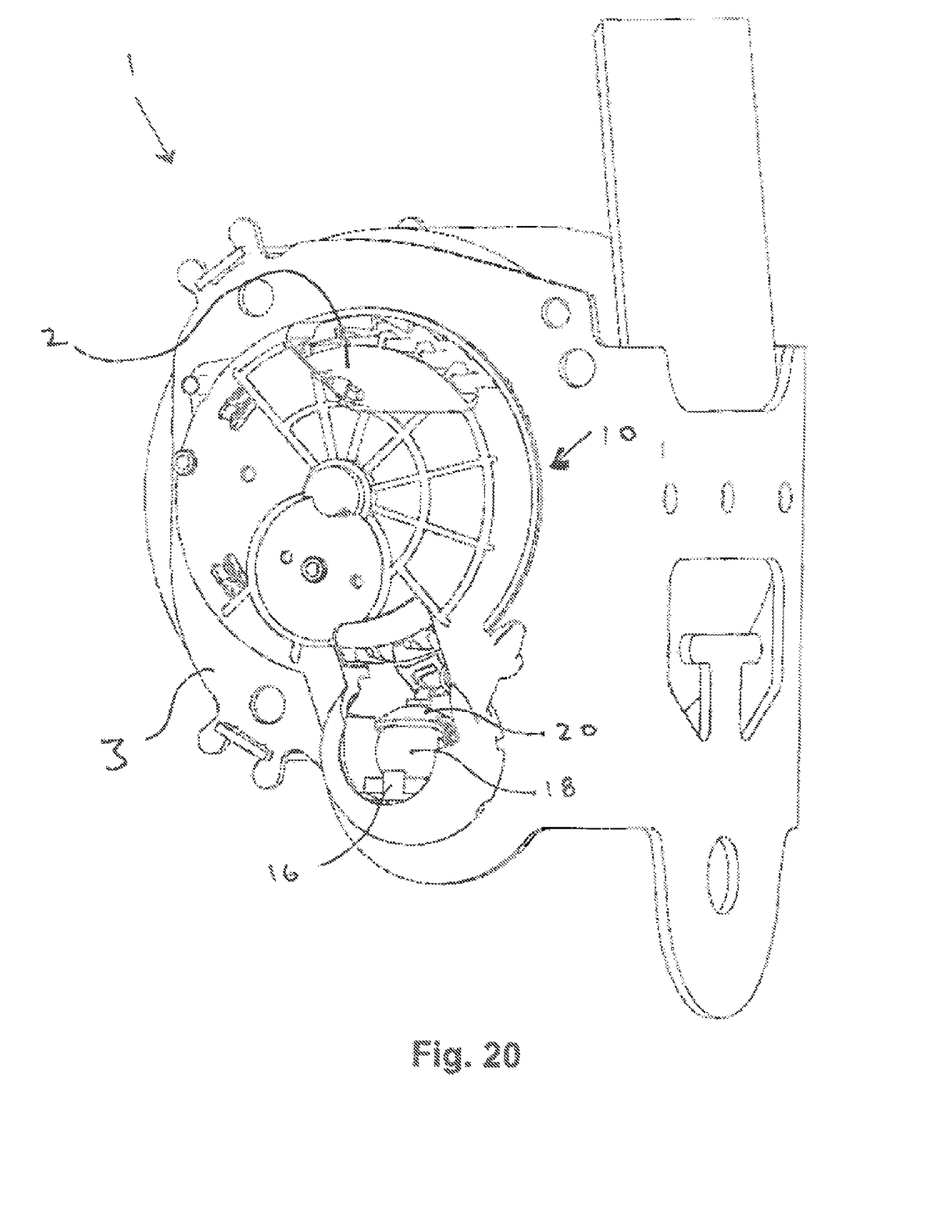
FIG. 20 is a perspective view of the belt retractor from FIG. 19.
Figure 21:
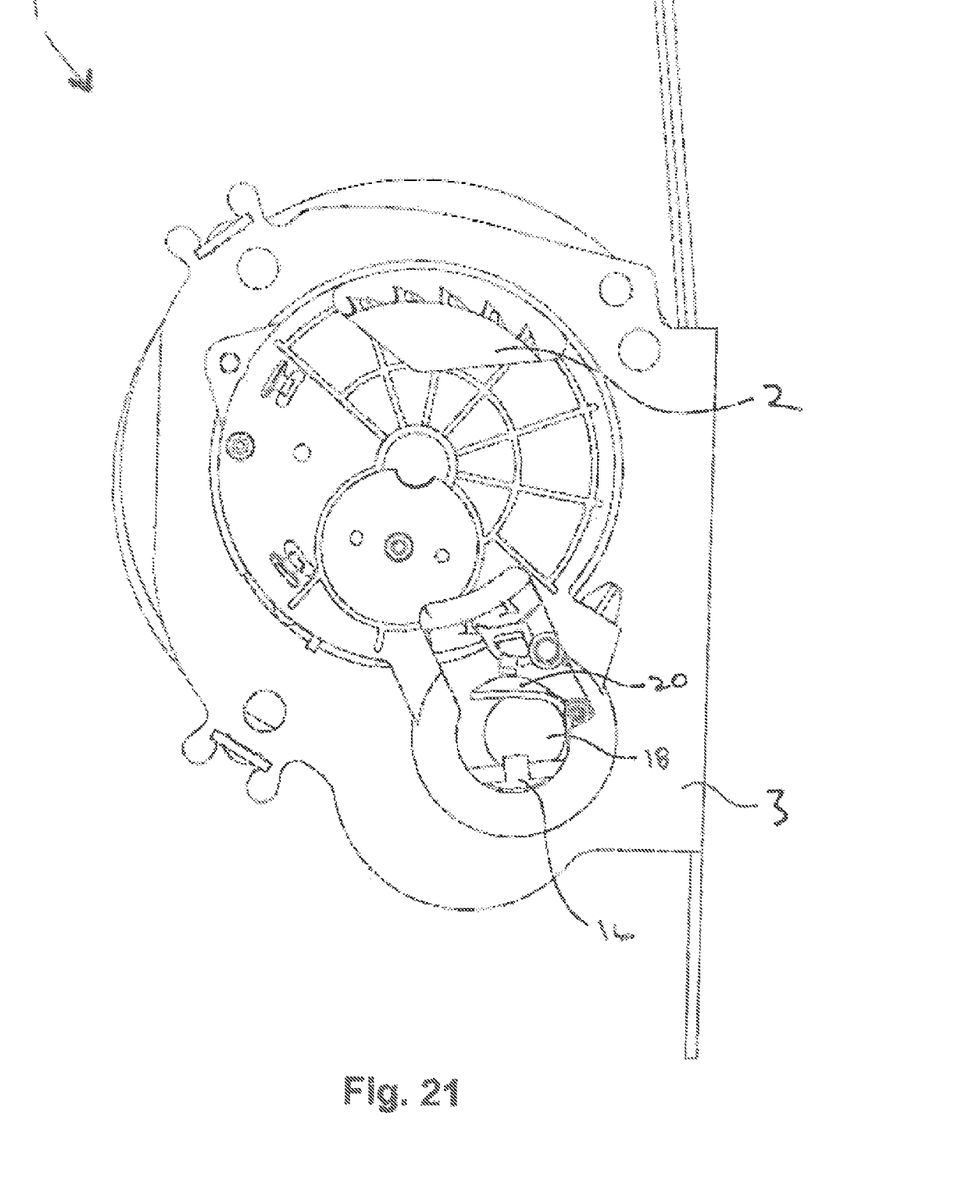
FIG. 21 is a side view of the belt retractor according to the invention in a blocking position with portions of the belt retractor omitted for clarity.
Figure 22:
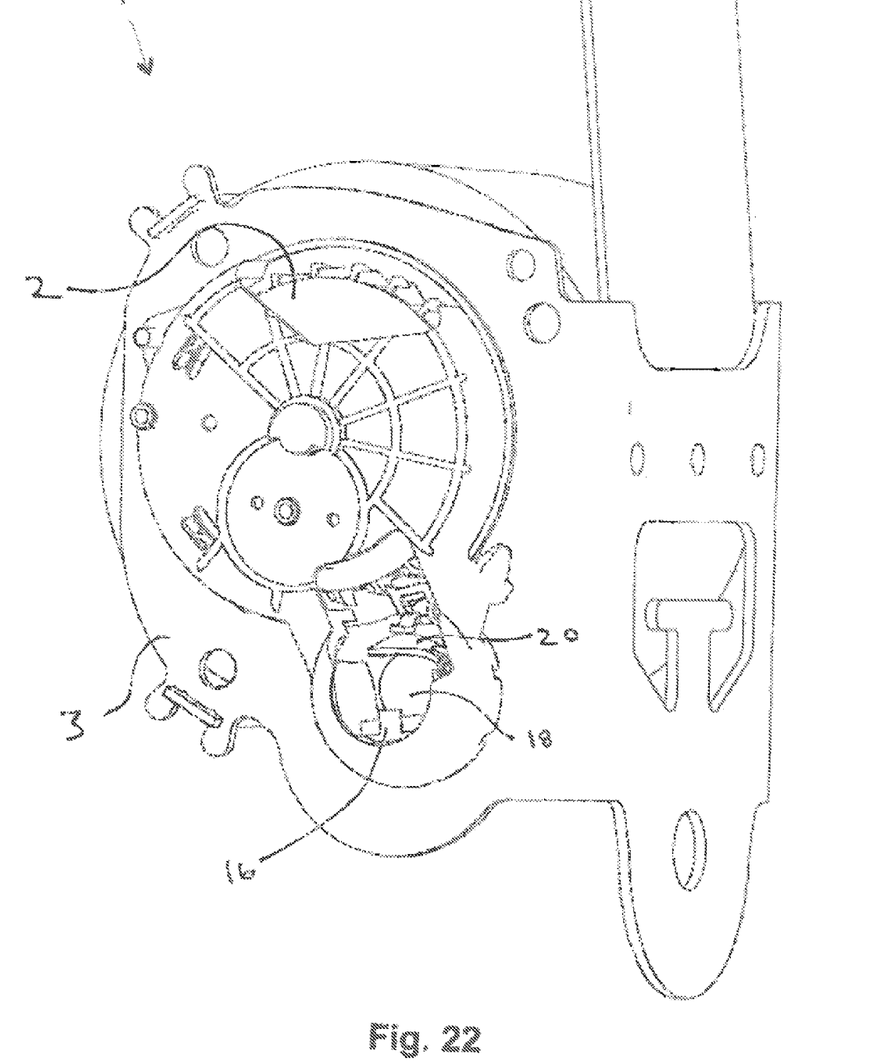
FIG. 22 is a perspective view of the belt retractor from FIG. 21.
Figure 23:
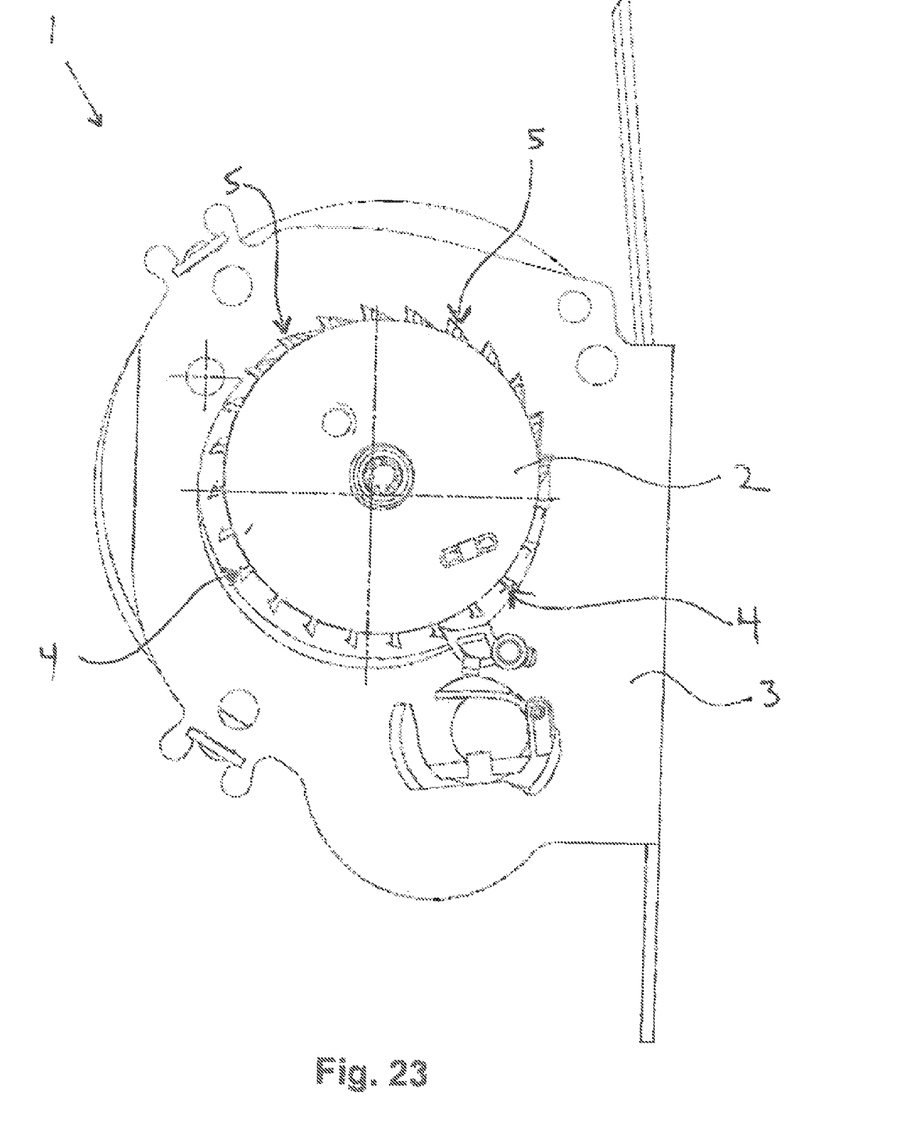
FIG. 23 is a side view of the belt retractor from FIG. 21 with additional portions of the belt retractor omitted for further clarity.
Figure 24:
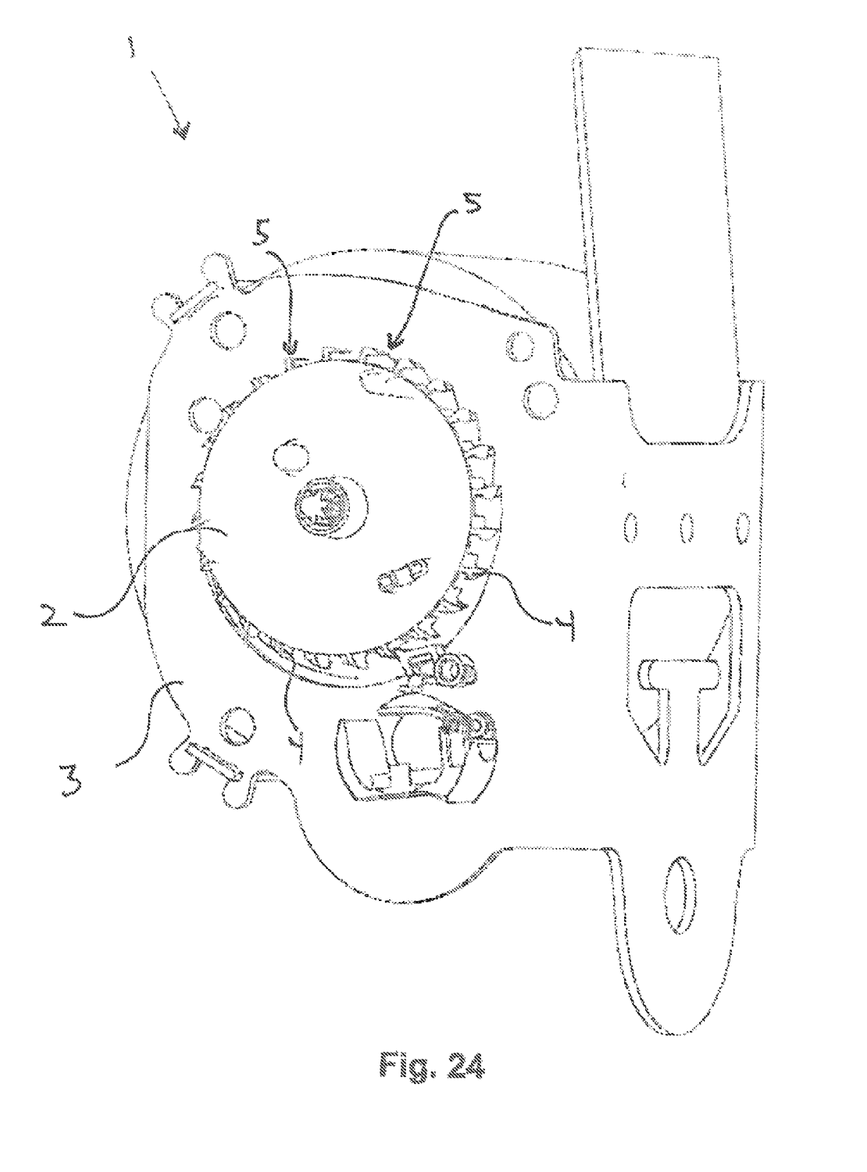
FIG. 24 is a perspective view of the belt retractor from FIG. 23.

The sensor is shown in an enlarged view in FIGS. 3 and 4. The inertia body 18 is received in the sensor 16 and adopts a stable idle position in the same. The inertia body 18 can be moved out of the idle position by external forces due to vibration, strong deceleration or the like. In the present case of a spherical inertia body 18, this means a displacement of the center M of the inertia body 18 (which coincides with the point of gravity). In other inertia bodies, as they are used e.g. in "standing man" or "bell" sensors, the movement out of the idle position is performed in the form of tilting or pivoting movement about an axis.

The inertia body 18 is partly covered by a cap portion 22 of the sensor lever 20. The sensor lever 20 in turn is supported on the sensor housing 16 or a bearing portion fixedly connected to the latter so that the cap portion 22 is deflected (pivoted) in a defined manner by a movement of the inertia body 18 out of the idle position thereof. The shape of the cap portion 22, especially the spherical outer surface thereof, is selected so that the cap can be considered to be part of an (imaginary) hollow ball having the same center as the inertia body 18.

As can be best inferred from FIG. 4, a contact portion 24 of the intermediate lever 12 is resting on the cap portion 22 of the sensor lever 20. Thus the intermediate lever 12 is coupled to the sensor lever 20 and is pivoted by deflection thereof in the desired way so as to release blocking of the belt reel.

Especially important is the type of holding of the sensor in the holding fixture 10 which is immobile relative to the completely mounted belt retractor. The components inertia body 18, sensor housing 16 and sensor lever 20 constitute a unit adapted to be mounted at different orientations in the holding fixture 10. The inner geometric design of the holding fixture 10 and the outer geometric design of the sensor are adjusted to each other so that the sensor can be placed at various spatial orientations before it is finally fixed in the holding fixture. The basically possible orientations are resulting from rotations of the sensor about spatial axes extending through the center M of the inertia body (cf. FIG. 4).

For this, it is provided in the preferred embodiment illustrated in the Figures that the sensor housing 16 includes one or more portions having an outer surface exhibiting the rounding of an (imaginary) ball whose center coincides with the center M of the inertia body 18. This is equally applicable to an inner surface of one or more portions of the holding fixture 10, i.e. this surface, too, exhibits the rounding of an (imaginary) ball whose center corresponds to the center M of the inertia body. As long as the sensor comes to rest with the spherical outer surface on the spherical inner surface of the holding fixture, it is ensured that the center of the inertia body 18 (in its idle position) always adopts the same predetermined position relative to the holding fixture 10.

Thanks to the spherical surfaces a continuous rotation of the sensor about all spatial axes is basically possible. After adjusting the desired mounting position the sensor is permanently fixed in the holding fixture 10.

The possible mounting positions are merely restricted by the fact that the coupling of the sensor lever 20 to the intermediate lever 12 essential for the function has to be guaranteed. In the present case this means that the cap portion 22 of the sensor lever 20 contacts the opposite contact portion 24 of the intermediate lever 12 and deflection of the sensor lever 20 causes sufficient pivoting of the intermediate lever 12.

In FIGS. 5 to 16 various possible mounting positions of the sensor in the holding fixture 10 are exemplified. It is evident from these Figures that the contact portion 24 of the intermediate lever 12 and the cap portion 22 of the sensor lever 20 are designed so that a rotation of the sensor in the holding fixture 10—within the afore-defined limits—does not influence the position of the intermediate lever 12, i.e. in no admissible mounting position is a clearance between the sensor lever 20 and the intermediate lever 12 or any significant deflection of the intermediate lever 12 provided compared to a different mounting position, which would entail differently large clearances between the tip 14 of the intermediate lever 12 and the control tooth system of the belt reel.

Imaginable are also other geometric designs of the sensor and the holding fixture 10 that permit orientations of the sensor rotated about the center M of the inertia body 18.

The afore-described assembly can also be used in belt retractors that are not based on the "floating spool" concept but include a non-displaceable belt reel and a separate coupling disk having a locking tooth system.

LIST OF REFERENCE NUMERALS

- 1 belt retractor
- 2 belt reel
- 3 frame
- 4 blocking tooth system
- 5 blocking teeth
- 10 holding fixture
- 12 intermediate lever
- 14 tip
- 16 sensor housing
- 18 inertia body
- 20 sensor lever
- 22 cap portion
- 24 contact portion

The invention claimed is:

1. An assembly for a belt retractor, comprising: a vehicle-sensitive sensor and a holding fixture (10) for the sensor, wherein the holding fixture is a pivot lever configured to rotatably support a belt reel in a frame for movement between a release position in which the belt reel can freely rotate relative to the frame and a blocking position in which a blocking tooth system of the belt reel engages blocking teeth at the frame to prevent rotation of the belt reel relative to the frame, the sensor moving with the holding fixture relative to the frame between the release position and the blocking position, and wherein an outer surface of the sensor interacts with an inner surface of the holding fixture (10) so that the sensor can be mounted at different spatial orientations in the holding fixture (10).

2. The assembly according to claim 1, wherein the sensor includes an inertia body (18) adapted to be moved out of an idle position due to forces acting from outside, and the inner surface of the holding fixture (10) is symmetrical with respect to a center (M) or the point of gravity or a tilt or pivot axis of the inertia body (18) in the idle position thereof.

3. The assembly according to claim 2, wherein the outer surface of the sensor is symmetrical with respect to the center (M) or point of gravity or a tilt or pivot axis of the inertia body (18) in the idle position thereof, the sensor including a sensor housing receiving the inertia body.

4. The assembly according to claim 2, wherein each of the inner receiving surface of the holding fixture (10) and the outer surface of the sensor has a radius of curvature whose center coincides with the center or point of gravity of the inertia body.

5. The assembly according to claim 1, wherein at the holding fixture an intermediate lever (12) is movably supported which can be pivoted by a movement of an inertia body (18).

6. The assembly according to claim 5, wherein a sensor lever (20) which is mounted at a sensor housing (16) receiving the inertia body (18) and is movably supported relative to the sensor housing (16) is arranged between the inertia body (18) and the intermediate lever (12).

7. The assembly according to claim 6, wherein the sensor lever (20) includes a cap portion (22) which covers the inertia body (18) and has an outer surface having a radius of curvature whose center coincides with the center (M) or point of gravity of the inertia body.

8. The assembly according to claim 1, wherein the sensor is permanently fixed independently of the spatial orientation in the holding fixture (10).

9. The assembly according to claim 1, wherein the different spatial orientations in which the sensor can be mounted in the holding fixture includes at least two degrees of freedom.

10. The assembly according to claim 1, wherein the sensor includes a sensor lever and an inertia body supported by the holding fixture, the inertia body being movable relative to the holding fixture to move the sensor lever into engagement with a cap portion that is configured to engage a control tooth system attached to the belt reel.

\* \* \* \* \*